F. D. BARTLETT.
PACKING FOR STUFFING BOXES.
APPLICATION FILED NOV. 24, 1908.
926,841.
Patented July 6, 1909.
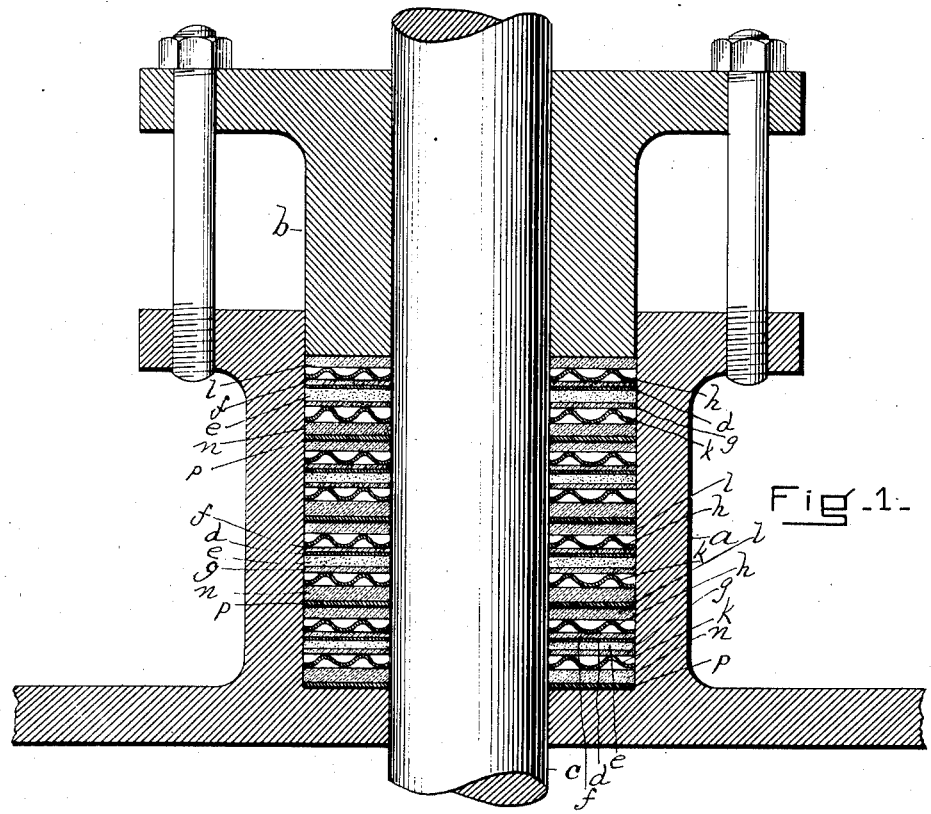
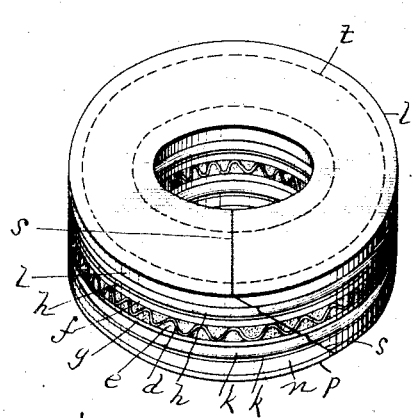
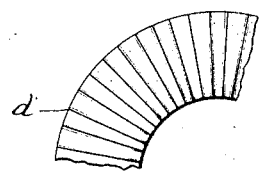
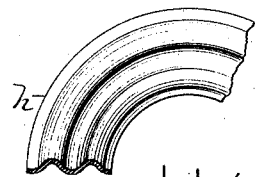
WITNESSES:
V. A. Atwood
Frederick A. Higgins
INVENTOR:
Frank D. Bartlett
By his Att'y.
Henry Williams

UNITED STATES PATENT OFFICE.

FRANK D. BARTLETT, OF SOMERVILLE, MASSACHUSETTS.

PACKING FOR STUFFING-BOXES.

No. 926,841.      Specification of Letters Patent.      Patented July 6, 1909.

Application filed November 24, 1908. Serial No. 464,303.

*To all whom it may concern:*

Be it known that I, FRANK D. BARTLETT, a citizen of the United States, residing in Somerville, in the county of Middlesex and State of Massachusetts, have invented new and useful Improvements in Packings for Stuffing-Boxes, of which the following is a specification.

This invention relates to flexible packings of that class which contain layers or rings composed of lubricating material, and the invention consists in the novel arrangement and construction of parts fully described below whereby the portions consisting of or composed of lubricating substances are pressed against the rod or piston and are held to their work without unnecessary wear.

In the drawings, in which similar letters of reference indicate corresponding parts—Figure 1 is a central vertical section of a series or pile of packings embodying my invention and contained in a stuffing-box, the rod or piston being illustrated in elevation. Fig. 2 is a perspective view of one of my packings removed. Fig. 3 is a detail of a portion of the central radially corrugated metallic ring removed. Fig. 4 is a similar view of a portion of one of the concentrically corrugated metallic rings removed.

$a$ represents an ordinary stuffing-box, $b$ being the gland, and $c$ is a rod or piston extending through the stuffing-box.

The central ring $d$ of this packing is radially corrugated, and consists of a soft, flexible metallic composition, preferably lead and tin, and within the corrugations of this flexible ring is a filling of lubricating substance or composition, preferably consisting of felt, grease and graphite, illustrated at $e$. Directly above and below this filled radially corrugated ring $d$ are flat rings of thin rubber $f$ and $g$ respectively. Directly above and below the rubber rings $f$ and $g$ respectively are concentrically corrugated metallic rings lettered $h$ and $k$ respectively, and directly above and below the corrugated rings $h$ and $k$ are thick rubber rings $l$ and $n$ respectively. Below the rubber ring $n$ is a metallic ring-shaped base $p$. All these rings are of the same size (although of different thicknesses), their inner edges being flush, as is also the case with their outer edges or peripheries. The metallic rings $d$, $h$ and $k$, being all made of a composition, preferably of lead and tin, are lubricating in their nature, and they, in connection with the filling $e$ are all intended to produce a lubricating effect on the central rod $c$. The basic ring $p$ is preferably made of the same material as the other metallic rings, and all the layers are flexible, thus producing a flexible packing. The layers are cut open on the line $s$ in order that the packing may be applied to the piston or rod $c$.

When the packing or a number of similar packings are placed in position in the stuffing-box, and the gland $b$ is screwed down upon them, the radially corrugated metallic ring $d$ and the concentrically corrugated metallic rings $h$, $k$ are compressed and slightly flattened whereby their inner edges are forced against the rod $c$, and the lubricating composition or filling $e$ is necessarily pressed or squeezed against said rod, thus effectually lubricating it, the lubricating effect being assisted by the slight wear on the inner edges of the metallic rings. As there are usually a number of packings in a single stuffing-box, as illustrated in Fig. 1, the metal rings $p$ at the bottom of each packing operate to prevent the particles on the inner edges of the rubber rings from wearing or rolling off.

In practice the wear on the inner edges of the metallic rings is very slight, but when such wear occurs to an appreciable extent, the corrugated metallic rings can be still further compressed and forced against the rod by forcing down the gland.

The metallic ring $p$ at the base is preferably secured to the rubber ring $n$ by any suitable adhesive substance, and the corrugated rings may also be adhesively secured to the rubber rings $e$ and $f$ if desired.

In practice after the parts have been assembled, whether in a mold or otherwise, they are usually stitched together as shown at $t$.

Having thus fully described my invention, what I claim, and desire to secure by Letters Patent, is:—

1. In a flexible packing for stuffing-boxes, a flexible metallic ring formed into radial corrugations which extend to its inner edge and are adapted to open against the rod which is surrounded by the stuffing-box, substantially flat rings on opposite sides of the radially corrugated ring, and a filling of lubricating material in said corrugations or grooves whereby when the stuffing-box is pressed the ring is somewhat flattened and the lubricating material is forced inward into contact with the rod, for the purpose set forth.

2. In a flexible packing for stuffing-boxes, a flexible metallic ring formed into radial corrugations which extend to its inner edge and are adapted to open against the rod which is surrounded by the stuffing-box, the grooves produced by said corrugations narrowing toward their inner ends, substantially flat rings on opposite sides of the radially corrugated ring, and a filling of lubricating material in said corrugations or grooves whereby when the stuffing-box is pressed the ring is somewhat flattened and the lubricating material is forced inward into contact with the rod, for the purpose set forth.

3. In a flexible packing for stuffing-boxes, a substantially central flexible metallic ring formed into radial corrugations which extend to its inner edge and are adapted to open against the rod which is surrounded by the stuffing-box, a pair of flexible rubber rings or washers respectively above and below the central radially corrugated metallic ring, a pair of flexible metallic rings respectively above and below the two rubber rings or washers, a pair of relatively thick flexible rubber rings respectively above and below the two metallic rings which are above and below the central corrugated metallic ring, and a filling of lubricating material in the corrugations or grooves on the opposite sides of the radially corrugated ring, whereby when the stuffing-box is pressed said radially corrugated ring is somewhat flattened and the lubricating material is forced inward into contact with the rod, for the purpose set forth.

In testimony whereof I have signed my name to this specification in the presence of two subscribing witnesses.

FRANK D. BARTLETT.

Witnesses:
HENRY W. WILLIAMS,
M. A. ATWOOD.